(12) United States Patent
Bergquist et al.

(10) Patent No.: US 10,470,141 B2
(45) Date of Patent: Nov. 5, 2019

(54) HANDLING OF HYPER FRAME NUMBER DE-SYNCHRONIZATION INCIDENTS

(71) Applicant: Telefonaktiebolaget LM Ericsson (publ), Stockholm (SE)

(72) Inventors: Gunnar Bergquist, Kista (SE); Samir Shah, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 15/547,959

(22) PCT Filed: Feb. 25, 2016

(86) PCT No.: PCT/SE2016/050136
§ 371 (c)(1),
(2) Date: Aug. 1, 2017

(87) PCT Pub. No.: WO2016/137381
PCT Pub. Date: Sep. 1, 2016

(65) Prior Publication Data
US 2018/0027512 A1 Jan. 25, 2018

Related U.S. Application Data

(60) Provisional application No. 62/121,060, filed on Feb. 26, 2015.

(51) Int. Cl.
*H04W 56/00* (2009.01)
*H04W 76/19* (2018.01)
(Continued)

(52) U.S. Cl.
CPC ......... *H04W 56/001* (2013.01); *H04W 56/00* (2013.01); *H04W 72/1263* (2013.01);
(Continued)

(58) Field of Classification Search
CPC ... H04W 56/001; H04W 28/06; H04W 56/00; H04L 1/0041; H04L 7/041
See application file for complete search history.

(56) References Cited

U.S. PATENT DOCUMENTS

2010/0246382 A1* 9/2010 Yi ........................... H04L 63/12
370/216
2012/0099525 A1* 4/2012 Maheshwari ......... H04L 63/068
370/328
(Continued)

FOREIGN PATENT DOCUMENTS

| EP | 2 139 292 A2 | 12/2009 |
| EP | 2 785 091 A1 | 10/2014 |
| WO | 2012 060565 A2 | 5/2012 |

OTHER PUBLICATIONS

3GPP TSG-RAN WG2 meeting #87; Dresden, Germany; Source: Qualcomm Incorporated; Title: Discussion on HFN de-synchronization and its impact to a VoLTE call (R2-143728)—Aug. 18-22, 2014.
(Continued)

*Primary Examiner* — Jae Y Lee
*Assistant Examiner* — Aixa A Guadalupe Cruz
(74) *Attorney, Agent, or Firm* — Sage Patent Group

(57) ABSTRACT

The present disclosure concerns radio communication. In one of its aspects, this disclosure presents a method of assisting a receiving side PDCP entity of a network to facilitate its handling of a HFN de-synchronization incident. The method is performed by an apparatus such as a UE and comprises: while a RRC connection is in progress; detecting (120), e.g. by means of a transmitting side PDCP entity of the UE, a condition indicative of the transmitting side PDCP entity experiencing a HFN de-synchronization or a risk of HFN de-synchronization; and in response thereto maintaining (130) the RRC connection and concurrently sending a
(Continued)

control message to the receiving side PDCP entity, the control message comprising information that the RRC connection is lasting and, thus, unbroken as well as information that the transmitting side PDCP entity is experiencing the HFN de-synchronization or the risk of HFN de-synchronization. Hereby it is made possible to allow for a limited, or reduced, signaling when handling HFN de-synchronization incidents.

11 Claims, 8 Drawing Sheets

(51) Int. Cl.
*H04W 72/12* (2009.01)
*H04W 74/00* (2009.01)
*H04W 74/08* (2009.01)
*H04W 84/04* (2009.01)

(52) U.S. Cl.
CPC ..... *H04W 74/002* (2013.01); *H04W 74/0866* (2013.01); *H04W 76/19* (2018.02); *H04W 84/042* (2013.01)

(56) References Cited

U.S. PATENT DOCUMENTS

2014/0098797 A1   4/2014   Kanamarlapudi et al.
2015/0036593 A1*  2/2015   Uchino ................ H04W 12/02
                                                370/328

OTHER PUBLICATIONS

PCT International Search Report for International application No. PCT/SE2016/050136—dated Jun. 7, 2016.
PCT Written Opinion of the International Searching Authority for International application No. PCT/ SE2016/050136—dated Jun. 7, 2016.

* cited by examiner

HANDLING OF HYPER FRAME NUMBER DE-SYNCHRONIZATION INCIDENTS

PRIORITY

This non-provisional application is a U.S. National Stage Filing under 35 U.S.C. § 371 of International Patent Application Serial No. PCT/SE2016/050136 filed Feb. 25, 2016, and entitled "Handling of Hyper Frame Number De-Synchronization Incidents" which claims priority to U.S. Provisional Patent Application No. 62/121,060 filed Feb. 26, 2015, both of which are hereby incorporated by reference in their entirety.

TECHNICAL FIELD

This disclosure generally relates to radio communication. More particularly, this disclosure presents a method of assisting a receiving side Packet Data Convergence Protocol (PDCP) entity of a network to facilitate its handling of a Hyper Frame Number (HFN) de-synchronization incident. A corresponding User Equipment (UE) for assisting a receiving side PDCP entity of the network to facilitate its handling of a HFN de-synchronization incident is also disclosed. A corresponding computer program and a carrier comprising the computer program are also presented. Furthermore, a corresponding transmitting side PDCP entity for assisting a receiving side PDCP entity to facilitate its handling of a HFN de-synchronization incident is presented.

BACKGROUND

Radio communication networks are widely deployed to provide various communication services such as telephony, video, data, messaging, broadcasts, and so on. Such communication networks support communications for multiple UEs by sharing the available network resources. One example of such a network is the Universal Mobile Telecommunications System (UMTS), a third generation (3G) mobile phone technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP.

Currently, there is a discussion about HFN de-synchronization in 3GPP. For example, HFN de-synchronization and its impact to a Voice over LTE (VoLTE) call was discussed at the 3GPP TSG-RAN WG2 meeting #82 in Dresden, Germany, 18-22 Aug. 2014, see e.g. the 3GPP meeting document R2-143728. As is mentioned in R2-143728, HFN de-synchronization for uplink (UL) and downlink (DL) has been discussed multiple times. Recently, in RAN2 #86, companies where encouraged to "investigate further whether there are any de-sync issues in the field and whether it could be preferable to define UE behavior (e.g., earliest from Rel-12) for these cases." Since then it has been confirmed that HFN de-synchronization is a reality, which may have an impact on VoLTE performance.

A potential problem with HFN de-synchronization for VoLTE is explained by the fact that operators use the Radio Link Control (RLC) Unacknowledged Mode (UM) Short (7-bit) PDCP sequence number (SN) option with an aim to minimize the packet overhead and thereby maximize coverage and capacity. If the UE is not scheduled in UL for a moment of time (e.g., a few seconds) due to e.g. a fading dip, then with short PDCP SN, there exists a risk that a PDCP entity of the UE discards too many already ciphered PDCP PDUs. For example, during a fading dip lasting a few seconds, it could be that too many ciphered PDCP PDUs in a row are either PDCP timer discarded by the UE because it is not scheduled or due to a long semi-persistent scheduling grant (e.g., transmitted but lost over the air). In other words, during a fading dip lasting a few seconds, it could be that too many ciphered PDCP PDUs in a row are discarded either due to the fact that lower layers do not find opportunities to transmit (e.g., discard by a PDCP timer expiry) or due to a loss of transmission over the air. Short PDCP SN wraps around after 128 PDUs which with 100% voice activity will cause HFN de-synchronization already after 2.56 seconds. Since SN uses 7 bits, it runs through 0, 1, 2, 3, . . . . 127 . . . and then "wraps around" just to run through 0, 1. 2, 3, . . . , again. This may cause duplicate SNs at the receiver, which can generally not be separated. Deciphering on the receiving side may then stall. In turn, this may be perceived as uncomfortable silence to the receiving end UE. The fault may pass unnoticed for the Key Performance Indicator (KPI) observer since VoLTE typically uses RLC UM for packet delivery.

One proposal to handle the HFN de-synchronization that is under discussion is to let the UE detect HFN de-synchronization on a RLC UM bearer and then have UE autonomously declare radio link failure whereupon the UE would fall back to the RRC_IDLE state, or RRC_IDLE mode (RRC is an abbreviation for Radio Resource Control). From the RRC_IDLE state, the UE would then initiate a re-establishment of the RRC connection. In other words, this proposal suggests that the network forces the UE to go to its RRC_IDLE state upon detection of a HFN de-synchronization incident.

The following is a reference that could provide additional background information to the reader. This reference may facilitate the understanding of one or more aspects of the technology described in this disclosure:

U.S. Pat. No. 8,180,299 B2, "Optimized AM RLC Re-Set Mechanism", published on May 15, 2012. This document describes a mechanism for WCDMA whereby the RLC layer can be re-set. The RLC re-set procedure according to this document is triggered by a RLC delivery failure.

SUMMARY

It is in view of the above considerations and others that the various embodiments disclosed herein have been made.

The present disclosure recognizes the fact that the above-mentioned proposal may mean unnecessarily much signaling. A solution where the network forces the UE into the RRC_IDLE state means that the UE will later have to initiate a re-establishment of the RRC connection. This disclosure recognizes the fact that the RRC connection may, in fact, be unbroken even if a UE experiences a HFN de-synchronization incident. For example, there exist situations where it is possible that only the VoIP bearer with the short PDCP SN experienced the HFN de-synchronization, whereas all the other DRB (Dedicated radio bearer) and SRB (Signaling radio bearer) bearers for the UE are still ok, or acceptable. Forcing the UE to its RRC_IDLE state when the RRC connection is unbroken means that the UE will drop its unbroken RRC connection and instead initiate re-establishment of the RRC connection. This results in unnecessarily much signaling. Also, this additional signaling may consume battery resources of the UE.

It is therefore a general object to enable a limited, or reduced, signaling when handling HFN de-synchronization incidents. This object is addressed by the various embodiments described herein.

In one of its aspects, the technology presented herein therefore concerns a method of assisting a receiving side PDCP entity of a network to facilitate its handling of a HFN de-synchronization incident. The method is performed by an apparatus (e.g., a UE) and comprises, while a RRC connection is in progress: detecting, by means of a transmitting side PDCP entity of the apparatus (e.g., UE), a condition indicative of the transmitting side PDCP entity experiencing a HFN de-synchronization or a risk of HFN de-synchronization; and in response thereto maintaining the RRC connection and concurrently sending, i.e. transmitting, a control message to the receiving side PDCP entity of the network, the control message comprising information that the RRC connection is lasting and, thus, unbroken as well as information that the transmitting side PDCP entity is experiencing the HFN de-synchronization or the risk of HFN de-synchronization.

There may exist different ways of detecting the condition indicative of the transmitting side PDCP entity experiencing a HFN de-synchronization or a risk of HFN de-synchronization. In one embodiment, the method comprises estimating a number of consecutive ciphered PDCP PDUs that are lost, comparing the estimated number of consecutive ciphered PDCP PDUs that are lost with a predefined threshold value, and determining that there exists a condition indicative of the transmitting side PDCP entity experiencing a HFN de-synchronization or a risk of HFN de-synchronization in response to that the estimated number of consecutive ciphered PDCP PDUs that are lost is higher than the predefined threshold value. Other ways detecting the condition indicative of the transmitting side PDCP entity experiencing a HFN de-synchronization or a risk of HFN de-synchronization are also conceivable, some of which are under discussion in 3GPP (see e.g., R2-143728).

In one embodiment, the method also comprises including, into the control message, a report comprising details related to the experienced HFN de-synchronization or the experienced risk of HFN de-synchronization.

In one embodiment, the method also comprises including, into the control message, information related to a proposed re-set action to be used by the receiving side PDCP entity of the network.

The control message may e.g. be a PDCP control Protocol Data Unit (PDU).

In some embodiments, the method further comprises triggering a RRC counterCheck procedure to verify that HFN synchronization has regained, or recovered.

In one embodiment, the method may additionally, or alternatively, comprise the step, or action, of receiving a message from the receiving side PDCP entity of the network, wherein said message comprises information or an indication that the receiving side PDCP entity of the network has lost its HFN synchronization. Thus, the apparatus (e.g., UE) can be informed about such situation.

In another of its aspects, the technology presented herein concerns computer program, comprising instructions which, when executed on at least one processor, cause the at least one processor to carry out the method according to the aspect described hereinabove. A carrier comprising said computer program may also be provided. The carrier may be one of an electronic signal, an optical signal, a radio signal, or a computer readable storage medium.

In still another of its aspects, the technology presented herein concerns an apparatus (e.g., UE) for assisting a receiving side PDCP entity of a network to facilitate its handling of a HFN de-synchronization incident. The apparatus (e.g., UE) may be configured to perform, or otherwise execute, the method of the aspect described hereinabove. The apparatus (e.g., UE) comprises: a transmitting side PDCP entity; a processor; and a memory comprising instructions executable by the processor whereby the apparatus (e.g., UE) is operative to: while a RRC connection is in progress; detect, by means of the transmitting side PDCP entity, a condition indicative of the transmitting side PDCP entity experiencing a HFN de-synchronization or a risk of HFN de-synchronization; and in response thereto maintain the RRC connection and concurrently send, by means of the transmitting side PDCP entity, a control message to the receiving side PDCP entity of the network, the control message comprising information that the RRC connection is lasting and, thus, unbroken as well as information that the transmitting side PDCP entity is experiencing the HFN de-synchronization or the risk of HFN de-synchronization.

In one embodiment, the memory comprises additional instructions executable by the processor whereby the transmitting side PDCP entity is operative to include, into the control message, a report comprising details related to the experienced HFN de-synchronization or the experienced risk of HFN de-synchronization.

In one embodiment, the memory comprises additional instructions executable by the processor whereby the transmitting side PDCP entity is operative to include, into the control message, information related to a proposed re-set action to be used by the receiving side PDCP entity of the network.

The control message may e.g. be a PDCP control Protocol Data Unit (PDU).

In some embodiments, the memory comprises additional instructions executable by the processor whereby the transmitting side PDCP entity is operative to: trigger a RRC counterCheck procedure to verify that HFN synchronization has regained.

As will be appreciated from the above, an apparatus (e.g., UE) is capable of maintaining its unbroken RRC connection. At the same time, the PDCP entity of the apparatus (e.g., UE) can report to a receiving side PDCP entity of the network that the RRC connection is unbroken. Moreover, the apparatus (e.g., UE) can report that it is experiencing the HFN de-synchronization or the risk of HFN de-synchronization. Subsequently, when the above-mentioned control message is received by the receiving side PDCP entity of the network, the network (or a network element(s) thereof) can make an increasingly well-informed decision and handle the HFN de-synchronization incident without necessarily ordering, or instructing, the apparatus (e.g., UE) to move into the RRC_IDLE mode. In other words, this allows for assisting the network to facilitate its handling of HFN de-synchronization incident by letting the network to take more well-informed decisions and, accordingly, take more appropriate measures to handle the HFN de-synchronization incidents. By taking more appropriate measures, it is possible to avoid dropping unbroken RRC connections. This will mean that apparatuses (e.g., UEs) have to perform less re-establishments of RRC connections and, in turn, this may limit the overall signaling between the apparatus (e.g., UE) and the network.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter with reference to the accompanying drawings, in which certain embodiments are shown. The present invention may, however, be embodied in many different forms and should not be construed as limited to the embodiments set forth herein; rather, these embodiments are provided by way of example so that this disclosure will be thorough and complete, and will fully convey the scope of the present invention to those persons skilled in the art. Like reference numbers refer to like elements or method steps throughout the description.

Figure 1A:
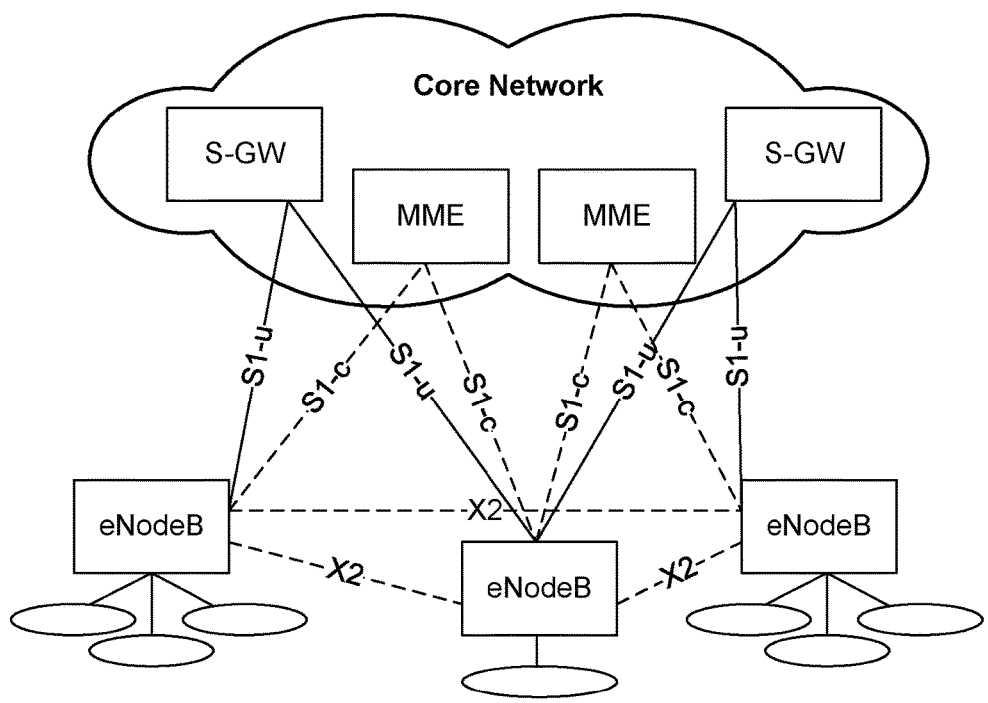
FIG. 1A illustrates radio network interfaces (Source: 4G LTE/LTE-Advanced for Mobile Broadband)

FIG. 1A schematically illustrates a radio interface architecture of a LTE system. More particularly, FIG. 1A illustrates radio network interfaces of a LTE system. More detailed descriptions of the overall system architecture can be found in literature, such as in Chapter 8.1 of the reference book 4G LTE/LTE-Advanced for Mobile Broadband by Erik Dahlman, Stefan Parkvall and Johan Sköld (ISBN: 978-0-12-385489-6).

Figure 1B:
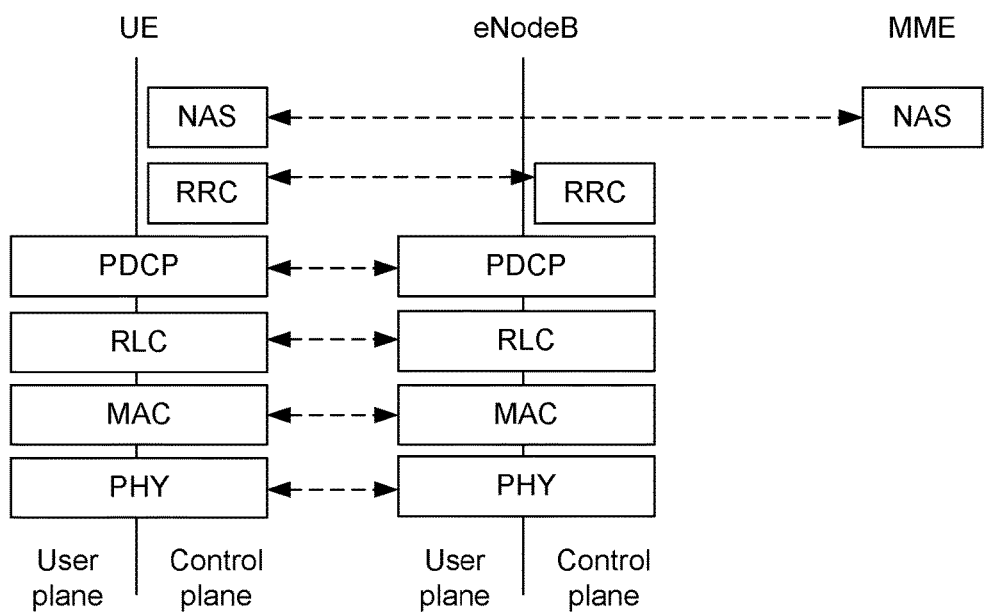
FIG. 1B illustrates an overall RAN protocol architecture.

With this network architecture in mind, the radio access network (RAN) protocol architecture may be briefly discussed. FIG. 1B schematically illustrates the RAN protocol architecture. More detailed descriptions of the RAN protocol architecture can be found in Chapter 8.2 of the earlier-mentioned reference book 4G LTE/LTE-Advanced for Mobile Broadband.

As described earlier, it has been proposed to resolve HFN de-synchronization incidents by letting the network (or, rather a network element thereof, e.g. an apparatus such as an evolved NodeB (eNB)) forcing a UE to move to its RRC_IDLE state upon detection of an HFN de-synchronization incident. A solution where the network forces the UE into the RRC_IDLE state means that the UE will later have to initiate a re-establishment of the RRC connection. This disclosure recognizes the fact that the RRC connection may, in fact, be unbroken even if a UE experiences a HFN de-synchronization incident. Forcing the UE to its RRC_IDLE state when the RRC connection is unbroken would mean that the UE would drop its unbroken RRC connection and instead initiate re-establishment of the RRC connection. This would result in unnecessarily much signaling. Also, this extra signaling would consume battery resources of the UE.

It is therefore a general object of embodiments described herein to enable a limited, or reduced, signaling when handling HFN de-synchronization incidents. This object is addressed by the various embodiments described herein.

To address this general object, in accordance with an embodiment, described herein are a method as well as a UE for assisting a network (or a network element thereof) to facilitate its handling of a HFN de-synchronization incident.

Figure 2:
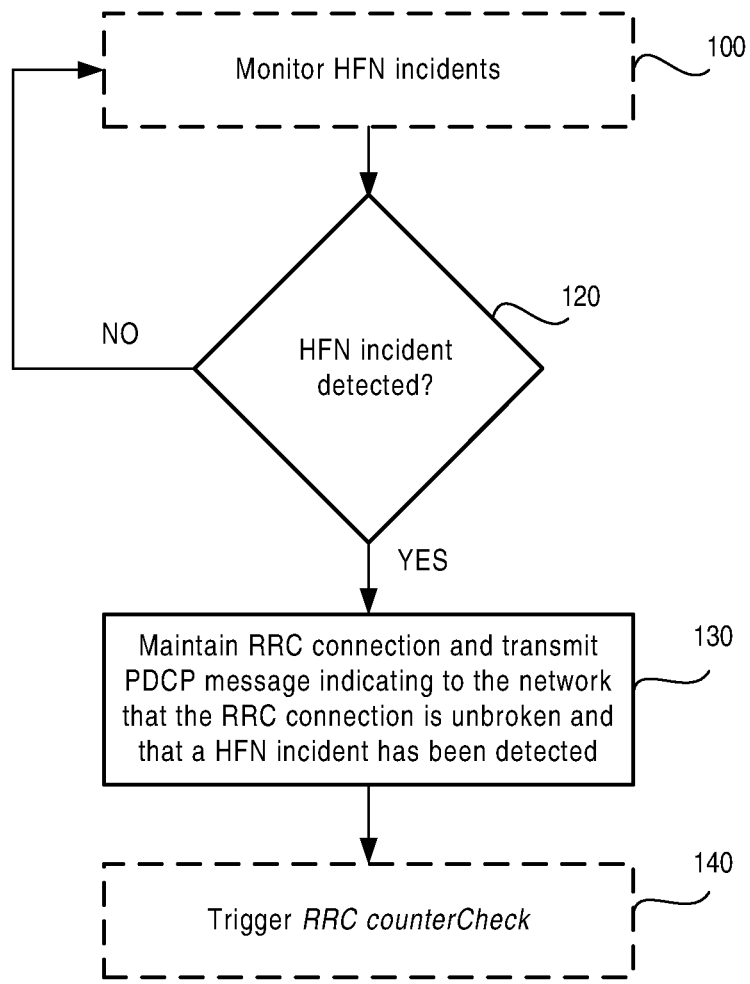
FIG. 2 is a flowchart illustrating an example embodiment of a HFN de-synchronization notification method.

FIG. 2 illustrates an exemplary embodiment of a method of assisting a network (or one or more network elements thereof) to facilitate its handling of a HFN de-synchronization incident. The method illustrated in FIG. 2 is typically performed by an apparatus, such as a UE. In the following example, the apparatus is exemplified as a UE. As used herein the term UE is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes machine type communication (MTC) devices, which do not necessarily involve human interaction.

While a RRC connection is in progress, a transmitting side PDCP entity of the UE may optionally monitor 100 HFN de-synchronization or, alternatively, a risk of HFN de-synchronization. If, or when, the PDCP entity of the UE does not detect (cf. "NO" in FIG. 2), or otherwise determine, any HFN de-synchronization or any risk of HFN de-synchronization, the PDCP entity of the UE may continue monitoring 100 HFN de-synchronization or, alternatively, a risk of HFN de-synchronization. If, or when, a condition indicative of the PDCP entity of the UE experiencing a HFN de-synchronization (or a risk of HFN de-synchronization) is detected 120 (cf. "YES" in FIG. 2), the UE maintains 130 the RRC connection. Furthermore, a control message is transmitted 130 to the receiving side PDCP entity of the network. The control message may e.g. be a PDCP control Protocol Data Unit (PDU). The control message comprises information that the RRC connection is lasting and, thus, unbroken. Additionally, the control message comprises information that the transmitting side PDCP entity of the UE is experiencing the HFN de-synchronization or the risk of HFN de-synchronization.

Figure 3:
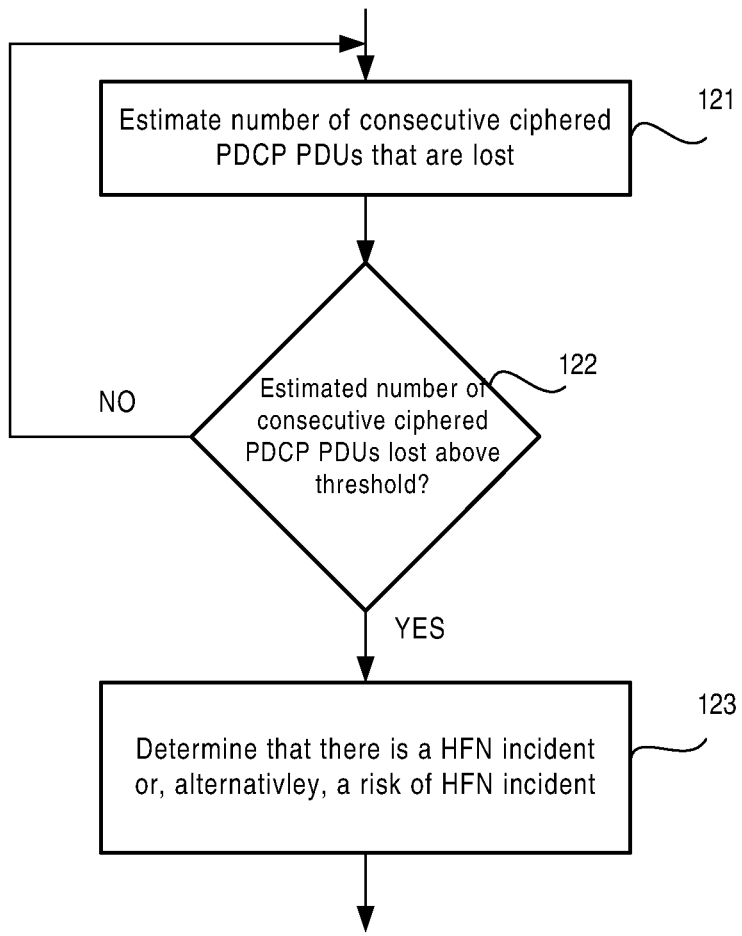
FIG. 3 illustrates example actions of detecting a HFN incident or a risk of HFN incident.

There may exist different ways of detecting the condition indicative of the transmitting side PDCP entity experiencing a HFN de-synchronization or a risk of HFN de-synchronization. In one embodiment, which is illustrated in FIG. 3, the method comprises estimating 121 a number of consecutive ciphered PDCP PDUs that are lost. Also, the estimated number of consecutive ciphered PDCP PDUs that are lost are compared 122 with a predefined threshold value. It is also determined 123, or otherwise established, that there exists a condition indicative of the transmitting side PDCP entity experiencing a HFN de-synchronization or a risk of HFN de-synchronization in response to that the estimated number of consecutive ciphered PDCP PDUs that are lost is higher than the predefined threshold value. This predefined threshold value should preferably be tested and evaluated for each specific case or scenario, e.g. in dependence of user demands and/or system requirements.

Figure 4:
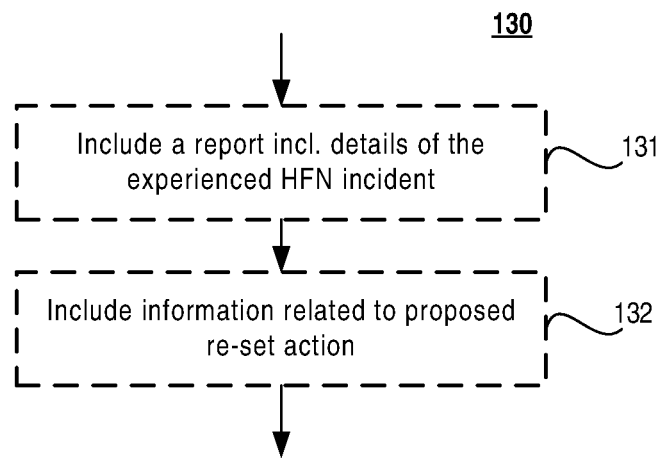
FIG. 4 illustrates example actions of including certain reports and/or information into a control message.

With reference to FIG. 4 optional sub-steps, or sub-actions, of the earlier-described step, or action 130, will now be described.

As can be seen in FIG. 4, a report may be included 131 into the control message. This report may comprise details related to the experienced HFN de-synchronization or the experienced risk of HFN de-synchronization. Additionally, or alternatively, information related to a proposed re-set action (to be used by the receiving side PDCP entity of the network) may optionally be included 132 into the control message. The proposed re-set action may optionally be determined, or otherwise concluded, from the details related to the experienced HFN de-synchronization or the experienced risk of HFN de-synchronization. In some embodiments, action 132 may therefore follow conditionally from action 131. Also, although actions 131 and 132 are illustrated as separate actions, the actions of 131 and 132 may, alternatively, be combined into one single action.

A proposed re-set action may advantageously include i) resetting the HFN and/or ii) resetting the SN. Additionally, or alternatively, a proposed re-set action may include a DRB modification to switch to comparatively longer PDCP SN length. Additionally, or alternatively, a proposed re-set action may include triggering a DRB release procedure optionally followed by a DRB set-up procedure.

As will be appreciated from the above, a UE can maintain its lasting, and thus unbroken, RRC connection. At the same time, the transmitting side PDCP entity of the UE can report to a receiving side PDCP entity of the network that the RRC connection is unbroken. Moreover, the UE can report that the transmitting side PDCP entity of the UE is experiencing the HFN de-synchronization or the risk of HFN de-synchronization. Subsequently, when the above-mentioned control message is received by the receiving side PDCP entity of the network, the network (or rather the one or more network element(s) thereof) can make a well-informed decision and handle the HFN de-synchronization incident without necessarily ordering, or instructing, the UE to move into the RRC_IDLE mode. In other words, this allows for assisting the network to facilitate its handling of HFN de-synchronization incident by letting the network taking a well-informed decision and, accordingly, take an appropriate measure to handle the HFN de-synchronization incident. By taking more appropriate measures, it is possible to avoid dropping unbroken RRC connections. This will mean that UEs have to perform less re-establishments of RRC connections and, in turn, this may avoid or at least limit any overhead signaling between the UE and the network.

Figure 5:
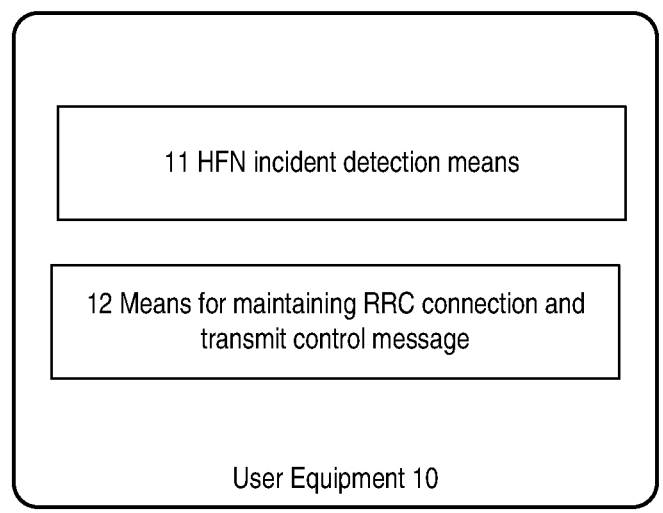
FIG. 5 illustrates an example embodiment of a UE.

FIG. 5 illustrates an example embodiment of a UE 10, which is adapted to perform or otherwise execute the method described hereinabove. The UE 10 is thus suitable for assisting a receiving side PDCP entity of a network to facilitate its handling of a HFN de-synchronization incident. The UE 10 comprise means 11 adapted to detect, while a RRC connection is in progress, a condition indicative of the transmitting side PDCP entity experiencing a HFN de-synchronization or a risk of HFN de-synchronization. The UE 10 also comprises means 12 adapted to maintain and concurrently send a control message to the receiving side PDCP entity of the network, the control message comprising information that the RRC connection is lasting and, thus, unbroken as well as information that the transmitting side PDCP entity is experiencing the HFN de-synchronization or the risk of HFN de-synchronization.

Optionally, the UE 10 may also comprise means (not shown) adapted to estimate a number of consecutive ciphered PDCP PDUs that are lost, means (not shown) adapted to compare the estimated number of consecutive ciphered PDCP PDUs that are lost with a predefined threshold value, as well as means (not shown) adapted to determine that there exists a condition indicative of the transmitting side PDCP entity experiencing a HFN de-synchronization or a risk of HFN de-synchronization in response to that the estimated number of consecutive ciphered PDCP PDUs that are lost is higher than the predefined threshold value.

As will be appreciated, the above-mentioned means may be combined into one single means or, alternatively, be provided in several (e.g., two or three) separate means.

Still further, the UE 10 may optionally also comprise means (not shown) adapted to include, into the control message, a report comprising details related to the experienced HFN de-synchronization or the experienced risk of HFN de-synchronization. Additionally, or alternatively, the UE 10 may comprise means (not shown) adapted to include, into the control message, information related to a proposed re-set action to be used by the receiving side PDCP entity.

Moreover, the UE 10 may optionally also comprise means (not shown) adapted to trigger a RRC counterCheck procedure to verify that HFN synchronization has regained.

Figure 6:
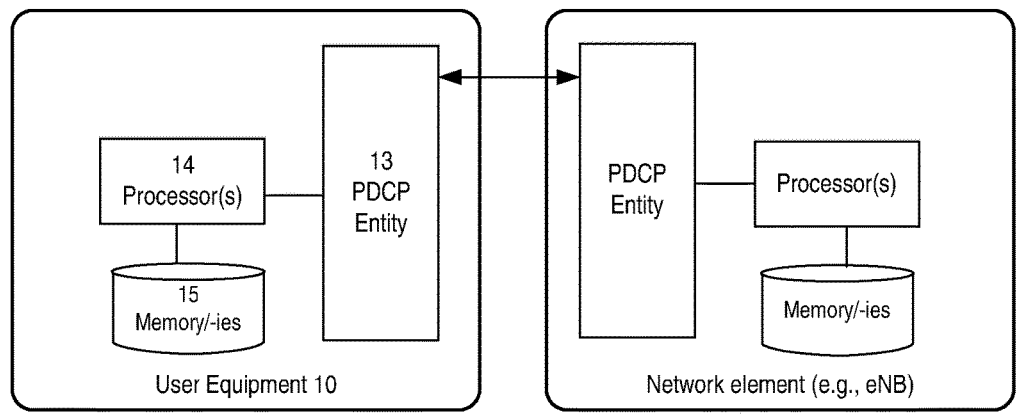
FIG. 6 illustrates an example implementation of a UE 10, which may be communicatively connected to a network element, such as an eNodeB.

FIG. 6 illustrates an example implementation of a UE 10, in accordance with one embodiment. The UE 10 is suitable for assisting a receiving side PDCP entity of a network (or rather one or more network elements thereof) to facilitate its handling of a HFN de-synchronization incident. In this example implementation, the UE 10 comprises a transmitting side PDCP entity 13, at least one processor 14, and at least one memory 15. The at least one memory 15 comprises instructions executable by the processor 14 whereby the UE 10 is operative to, while a RRC connection is in progress: detect, by means of the transmitting side PDCP entity 13, a condition indicative of the transmitting side PDCP entity experiencing a HFN de-synchronization or a risk of HFN de-synchronization; and in response thereto maintain the RRC connection and concurrently send, by means of the transmitting side PDCP entity, a control message to the receiving side PDCP entity of the network, the control message comprising information that the RRC connection is lasting and, thus, unbroken as well as information that the transmitting side PDCP entity is experiencing the HFN de-synchronization or the risk of HFN de-synchronization.

As will be appreciated, the memory 15 may also comprise instructions executable by the processor 14 whereby the UE 10 is operative to monitor HFN de-synchronization or risk of HFN de-synchronization while the RRC connection is in progress.

In one embodiment, the memory 15 further comprises instructions executable by the processor 14 whereby the UE 10 is operative to estimate a number of consecutive ciphered PDCP Packet Data Units, PDUs, that are lost; compare the estimated number of consecutive ciphered PDCP PDUs that are lost with a predefined threshold value, and also determine that there exists a condition indicative of the transmitting side PDCP entity experiencing a HFN de-synchronization or a risk of HFN de-synchronization in response to that the estimated number of consecutive ciphered PDCP PDUs that are lost is higher than the predefined threshold value.

In one embodiment, the memory 15 further comprises instructions executable by the processor 14 whereby the transmitting side PDCP entity 13 is operative to include, into the control message, a report comprising details related to the experienced HFN de-synchronization or the experienced risk of HFN de-synchronization.

In one embodiment, the memory 15 may additionally, or alternatively, comprise instructions executable by the processor 14 whereby the transmitting side PDCP entity 13 is operative to include, into the control message, information related to a proposed re-set action to be used by the receiving side PDCP entity of the network.

The control message may advantageously be a PDCP control PDU. Accordingly, the PDCP message may be transmitted from the transmitting side PDCP entity 13 of the UE to the receiving side PDCP entity of the network, as is schematically illustrated in FIG. 6.

Still further, the memory 15 may comprise instructions executable by the processor 14 whereby transmitting side PDCP entity 13 is operative to trigger a RRC counterCheck procedure to verify that HFN synchronization has regained, or otherwise recovered.

Figure 7:
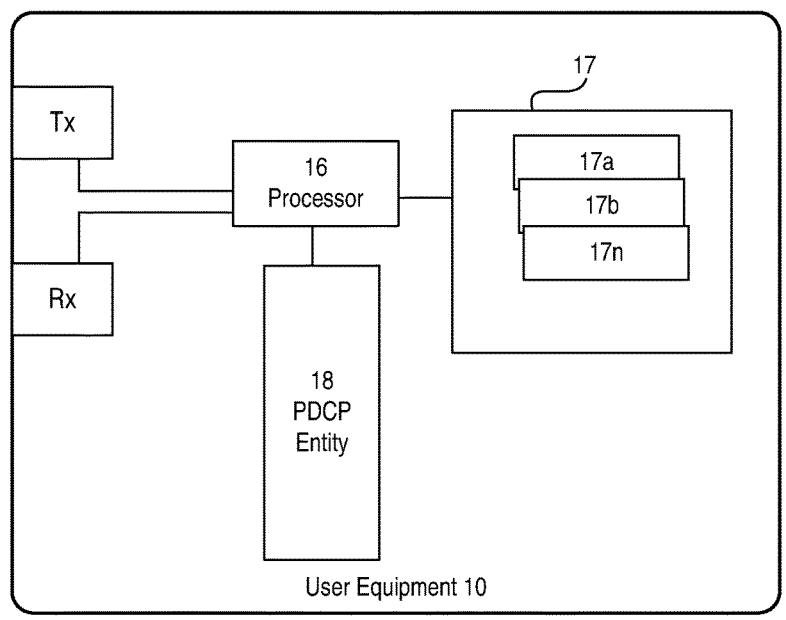
FIG. 7 illustrates another example implementation of a UE 10.

FIG. 7 illustrates another example implementation of a UE 10, in accordance with one embodiment. The UE 10 is suitable for assisting a receiving side PDCP entity of a network (or, rather, one or more network elements thereof) to facilitate its handling of a HFN de-synchronization incident. In this example implementation, the UE 10 comprises a processor 16, one or several modules 17a-c, and a PDCP entity 18. Also, a communications interface may be provided in order to allow the UE 10 to communicate with other apparatuses (e.g., network elements such as an eNB), etc. To this end, the communications interface may comprise a transmitter (Tx) and a receiver (Rx). Alternatively, the communications interface may comprise a transceiver (Tx/Rx) combining both transmission and reception capabilities. The communications interface may include a RF interface allowing the UE 10 to communicate with apparatuses etc through a radio frequency band through the use of different radio frequency technologies such as LTE, WCDMA, any other cellular network standardized by the 3rd Generation Partnership Project (3GPP), or any other wireless technology such as Wi-Fi, Bluetooth®, etcetera.

In one example implementation, a HFN incident detection module 17a is provided for detecting, while a RRC connection is in progress, a condition indicative of the transmitting side PDCP entity 18 of the UE 10 experiencing a HFN de-synchronization or a risk of HFN de-synchronization. A HFN incident handling module 17b may be provided for, in response to the HFN incident detection module 17a detecting the condition indicative of HFN incident, maintaining the RRC connection and concurrently sending a control message to the receiving side PDCP entity of the network, the control message comprising information that the RRC connection is lasting and, thus, unbroken as well as information that the transmitting side PDCP entity is experiencing the HFN de-synchronization or the risk of HFN de-synchronization.

In some embodiments, the HFN incident detection module 17a is configured to estimate a number of consecutive ciphered PDCP PDUs that are lost, compare the estimated number of consecutive ciphered PDCP PDUs that are lost with a predefined threshold value, and determine that there exists a condition indicative of the transmitting side PDCP entity experiencing a HFN de-synchronization or a risk of HFN de-synchronization in response to that the estimated number of consecutive ciphered PDCP PDUs that are lost is higher than the predefined threshold value.

Optionally, a message handling module 17c may also be provided. The message handling module 17c may be configured to include, into the control message, a report comprising details related to the experienced HFN de-synchronization or the experienced risk of HFN de-synchronization. Also, the message handling module 17c may additionally, or alternatively, be configured to include, into the control message, information related to a proposed re-set action to be used by the receiving side PDCP entity.

Still further, the HFN incident handling module 17c may optionally be further configured to trigger a RRC counter-Check procedure to verify that a HFN synchronization has regained.

Figure 8:
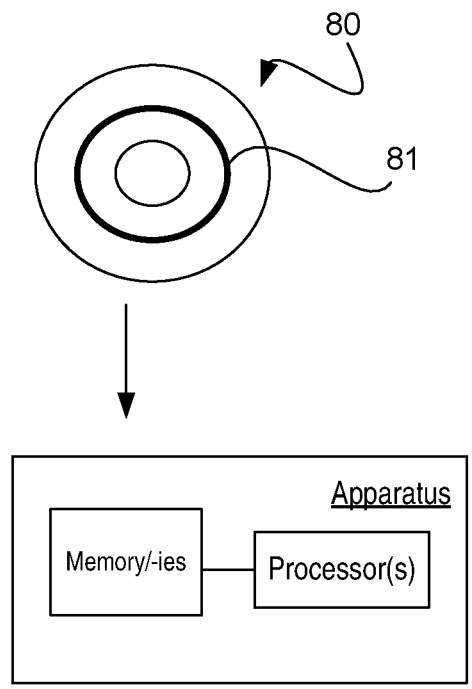
FIG. 8 illustrates an example embodiment of a computer-readable medium.

FIG. 8 shows an example of a computer-readable medium, in this example in the form of a data disc 80. In one embodiment the data disc 80 is a magnetic data storage disc. The data disc 80 is configured to carry instructions 81 that can be loaded into a memory of an apparatus. Upon execution of said instructions by a processor of the apparatus, the apparatus is caused to execute a method or procedure according to any one of the embodiments described with reference to FIGS. 2-4. The data disc 80 is arranged to be connected to or within and read by a reading device (not shown), for loading the instructions into the processor. One such example of a reading device in combination with one (or several) data disc(s) 80 is a hard drive. It should be noted that the computer-readable medium can also be other mediums such as compact discs, digital video discs, flash memories or other memory technologies commonly used. In such an embodiment the data disc 80 is one type of a tangible computer-readable medium. The instructions may alternatively be downloaded to a computer data reading device, such as a computer or other apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Various Detailed Embodiments of a UE Assisting a Network to Take Appropriate Measures Upon Detection of a HFN De-synchronization Incident As described earlier, it has been proposed to resolve HFN de-synchronization incidents by letting the network (or, rather a network element thereof, e.g. eNB) forcing a UE to move to its RRC_IDLE state upon detection of an HFN de-synchronization incident. A solution where the network forces the UE into the RRC_IDLE state means that the UE will later have to initiate a re-establishment of the RRC connection. This disclosure recognizes the fact that the RRC connection may, in fact, be unbroken even if a UE experiences a HFN de-synchronization incident. Forcing the UE to its RRC_IDLE state when the RRC connection is unbroken would mean that the UE would drop its unbroken RRC connection and instead initiate re-establishment of the RRC connection. This would result in unnecessarily much signaling. Also, this extra signaling would consume battery resources of the UE.

Furthermore, a potential disadvantage with the above-mentioned proposed solution is the time duration of a re-establishment would impact negatively on the voice call quality. There would potentially be an outage in the user plane extending beyond the time it takes to discourage the end-users in the voice call. The re-establishment may complete late and all the call parties might not remain (all=2, or occasionally more, e.g., in case of conference call). What could make this even worse is that the outage as a result of re-establishment could occurs for the whole connection, i.e. also for all bearers and services associated to the UE and moreover to the control plane. The latter could impact negatively on the paging success and generally on network capacity.

This disclosure recognizes that, unless all parts of the data radio bearer (DRB) are faulty, the occurrence of HFN de-synchronization does not necessarily need to be handled as a permanent radio link failure. Unless also some signaling radio bearer (SRB) is faulty, the occurrence of HFN de-synchronization on one single DRB does not necessarily render a permanent radio link failure.

As will be appreciated upon reading this disclosure, some superfluous UE autonomous actions may be avoided and the UE can instead indicate a risk or occurrence of HFN de-synchronization using a control message (e.g. a PDCP control PDU). In some implementations, the remaining control parts of the connection may e.g. be used to indicate, trigger and/or execute procedures that help to resolve the detected HFN de-synchronization problem.

An advantage with some of the herein described embodiments of the technology is that these embodiments may allow for less interruption and, hence, better user satisfaction for Voice over IP (VoIP). The embodiments described herein may allow the network to take controlled and appropriate action(s) upon detection of HFN de-synchronization.

A transmitting side PDCP entity may detect risk or occurrence of HFN de-synchronization. It may for example occur due to lack of transmission occasions. The embodiments described herein suggest such a transmitting side PDCP entity to indicate and report its findings without the risk exposure and service impact that generally comes with connection re-establishment. In particular, this provides for a solution to the HFN de-synchronization problem for VoLTE which uses RLC UM and short PDCP SN (7 bits) that is currently the assumption by 3GPP. However, it should be appreciated that the embodiments described herein may equally possible be useful for high bitrate Mobile Broadband (MBB) bearers that use longer PDCP SN. For instance, maybe the UE may indicate the fault in due time prior to the occurrence (e.g. half or percentage of SN space), or wait until it occurs (e.g. SN has already wrapped around).

In the following, a few detailed embodiments of the technology presented herein will be described in further detail. If the UE detects occurrence or eminent risk of HFN de-synchronization e.g. on a UL DRB, the UE may send an indication message using PDCP control. If there exists other errors on the DRB, the UE may instead use the structure and procedures associated with the UL SRB bearer (unless that is faulty, of course). The UE may optionally include relevant details of the problem, e.g. a pointer to the HFN for which the PDCP SN space was exhausted. Additionally, or alternatively, the UE may optionally include information related to the concerned faulty bearer and, optionally, also information related to a proposed (i.e., preferred) HFN re-set action. The network (or rather a network element thereof, e.g. eNB in its capacity as a network controller) may judge whether the proposed action is the most appropriate action, or request an alternative action, again utilizing the structure and procedures associated with the control part of that DRB (or, alternatively, instead SRB bearer).

The embodiments of the technology presented herein may also be applicable for a DL DRB. Thus, an eNB which detects risk or occurrence of HFN de-synchronization on a DRB, may send an indication using PDCP control, or over DL SRB. Alternatively, an eNB may instead immediately start to resolve the bearer problem using the structure and procedures associated with the SRB bearer. The reception of an indication of an UL DRB fault or the detection of a DL DRB fault may be used by the eNB to start the Counter check procedure or to trigger DRB modification or alternatively DRB release followed by an optional bearer setup, all of which would avoid much negative impact on service quality.

Upon detection of occurrence or eminent risk of HFN de-synchronization, PDCP entities help to bring an indication to radio access control (RAC) on the network side. RAC in this context may be the Radio Access Controller, e.g. located in the eNB. Upon reception of the indication, RAC may trigger one or several procedures to resolve the HFN de-synchronization fault. There already exists various such procedures in the standard, e.g. RAC may use RRC procedures such as DRB modification to increase the size of the PDCP SN length, 12 bits instead of 7 bits for RLC UM or 15 bits instead of 12 bits for RLC AM. Alternatively, it could instead use the DRB release followed by an optional DRB setup procedure.

Figure 9:
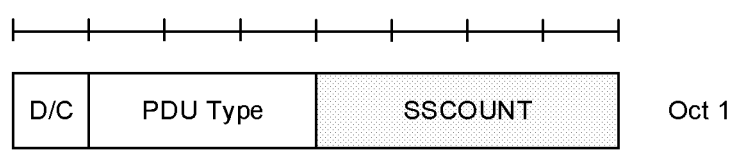
FIG. 9 illustrates an example control message (SS-COUNT, PDCP Control PDU for HFN de-synchronization)

As described herein, the embodiments of technology may use or otherwise utilize the PDCP layer. See FIG. 9 for one example of a control message in terms of which information may be comprised in the control message as well as number of bits used for that information.

Figure 10:
FIG. 10 illustrates a HFN in 3GPP TS 36.323.

SSCOUNT here is a shorter version of COUNT. It comprises none of PDCP SN bits but rather only a few Least Significant Bits (LSBs) of the HFN part, e.g. for the purpose of avoiding unnecessary bytes. This may be compared with a legacy COUNT which is illustrated in FIG. 10. The size of COUNT is typically 32 bits. The size of the HFN part in bits is generally equal to 32 minus the length of the PDCP SN. The length of PDCP SN is typically, but not necessarily, configured by higher layers and is either 7 or 12 for DRBs mapped to RLC UM or 12 or 15 for DRBs mapped to RLC AM.

Figure 11:
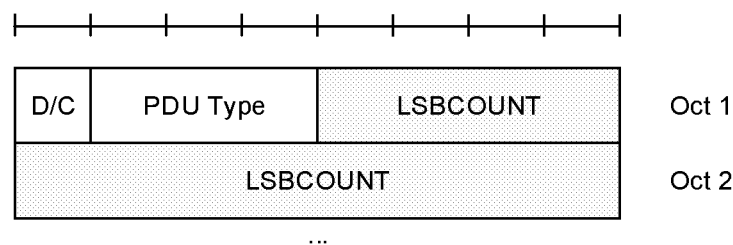
FIG. 11 illustrates LSBCOUNT, PDCP Control PDU format for HFN de-synchronization.

In order to minimize any negative impact on some applications it could be desired to achieve a faster re-establishment of the data plane than may be achieved by HFN re-synchronization. For this purpose, LSBCOUNT is another example that can be used, see e.g. FIG. 11. Also LSBCOUNT is a short and stripped version of COUNT but in contrary to SSCOUNT it additionally contains all PDCP SN bits.

The exact number of LSBs of the HFN to be used, e.g. in SSCOUNT or LSBCOUNT, and the exact format depends on factors such as size of PDCP SN and risk of multiple wraparounds. A good, or proper, solution would be one where the total sustainability of a DRB using SSCOUNT, or LSBCOUNT, is matched with some timer for Radio Connection Supervision (RCS) or IAS (Inactivity Supervision) used normally to judge complete radio connection failure. If that time is of order ~5s, i.e. approximately 5 seconds, already 1 bit can be enough to extend the sustainability of short PDCP (7 bits) if used for service voice assuming 100% voice activity (it takes 5.12s for a 8 bits PDCP SN to wrap around if the pace of packets is 50 Hz).

In some of the above examples it is proposed to use PDCP Control PDUs. Those may be passed un-ciphered. In some embodiments, it is possible to optionally trigger a RRC counterCheck procedure shortly after transmission and/or reception of the PDCP Control PDUs to verify that HFN sync is regained and to detect if a man-in-the middle type attack was made.

In alternative embodiments, the RRC layer of UE may be utilized. The UE could use some RRC structures and procedures similar to those which may be used to control, trigger and execute 3GPP 36.331 Measurement Reports. The indication may e.g. be sent to RAC on a dedicated control channel (DCCH) over SRB, see e.g. FIG. 12.

Figure 12:
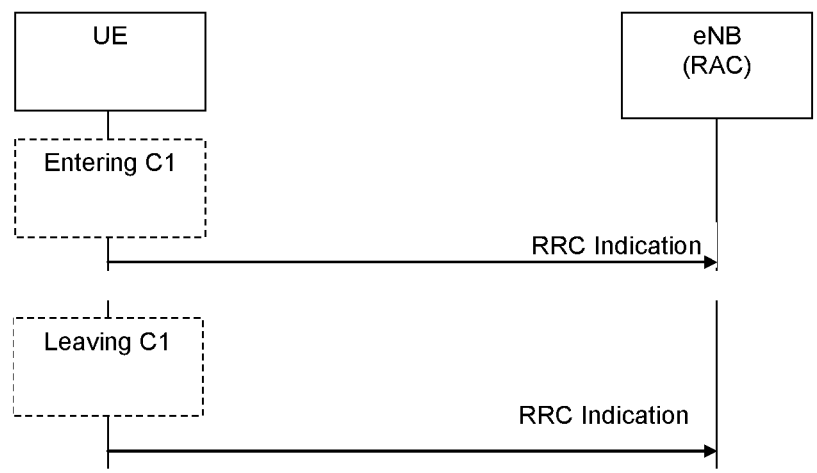
FIG. 12 illustrates an example using legacy methods to trigger and send indications over RRC.

Reference is now made to FIG. 12:
Event C1 (HFN De-synchronization is Eminent)
In this embodiment the UE shall:
1> consider the entering condition for this event to be satisfied when condition C1-1, as specified below, is fulfilled;
1> consider the leaving condition for this event to be satisfied when condition C1-2, as specified below, is fulfilled;
C1-1 (Entering Condition):
The risk of HFN de-synchronization is eminent. A substantial amount of PDCP SDUs are discarded or transmitted without acknowledgement. Only less than half of the PDCP SN space of contiguous PDCP SDUs remains.
C1-2 (Leaving Condition):
The risk of HFN de-synchronization is no longer eminent. More than half of the PDCP SN space of contiguous PDCP SDUs remains.

Figure 13:
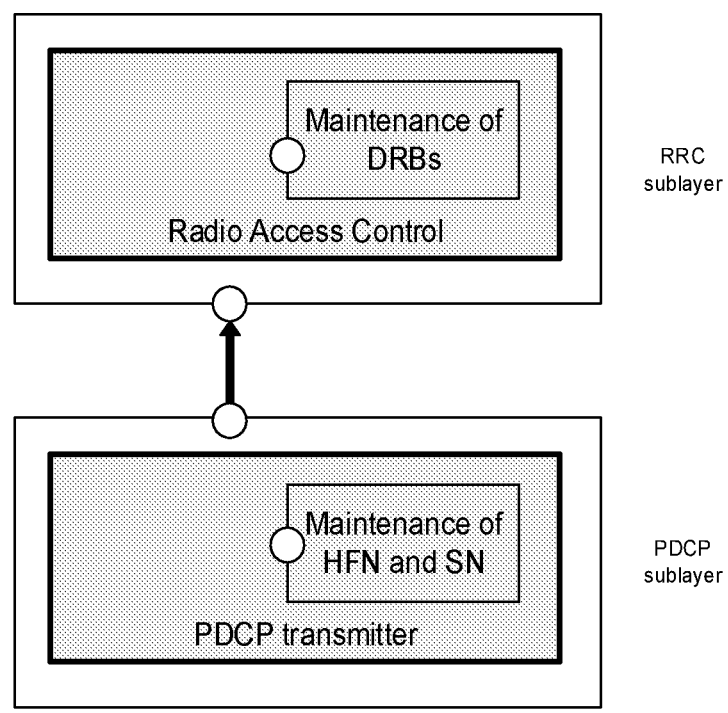
FIG. 13 illustrates an example transmission of indication to higher layer.

In another embodiment the idea is used internally in eNB. Upon detection of risk or occurrence of HFN de-synchronization for a DL DRB, the PDCP layer may send an indication to RAC, see e.g. FIG. 13.

Any vacant control parts of RLC and even MAC can be alternatively be engaged to offer additional embodiments with new structures to tailor the data layer transmission of the indication and actions.

Selected Example Embodiments

The present invention disclosed herein thus encompasses without limitation the following example embodiments:

1. A method of assisting a receiving side Packet Data Convergence Protocol, PDCP, entity of a network to facilitate its handling of a Hyper Frame Number, HFN, de-synchronization incident, the method being performed by a User Equipment, UE, and comprising:
   while a Radio Resource Control, RRC, connection is in progress;
   detecting, by means of a transmitting side PDCP entity of the UE, a condition indicative of the transmitting side PDCP entity experiencing a HFN de-synchronization or a risk of HFN de-synchronization; in response thereto
   maintaining the RRC connection and concurrently sending a control message to the receiving side PDCP entity, the control message comprising information that the RRC connection is lasting and, thus, unbroken as well as information that the transmitting side PDCP entity is experiencing the HFN de-synchronization or the risk of HFN de-synchronization.

2. The method according to embodiment 1, further comprising:
   including, into the control message, a report comprising details related to the experienced HFN de-synchronization or the experienced risk of HFN de-synchronization.

3. The method according to embodiment 2, further comprising:
   including, into the control message, information related to a proposed re-set action to be used by the receiving side PDCP entity.

4. The method according to any one of the embodiments 1-3, wherein the control message is a PDCP control Protocol Data Unit, PDU.

5. The method according to any one of the embodiments 1-5, further comprising:
   triggering a RRC counterCheck procedure to verify that HFN synchronization has regained.

6. Computer program, comprising instructions which, when executed on at least one processor, cause the at least one processor to carry out the method according to any one of embodiments 1-5.

7. A carrier comprising the computer program according to embodiment 6, wherein the carrier is one of an electronic signal, an optical signal, a radio signal, or a computer readable storage medium.

8. A User Equipment, UE, for assisting a receiving side Packet Data Convergence Protocol, PDCP, entity of a network to facilitate its handling of a Hyper Frame Number, HFN, de-synchronization incident, the UE comprising:
   a transmitting side PDCP entity:
   a processor; and
   a memory comprising instructions executable by the processor whereby the UE is operative to:
   while a Radio Resource Control, RRC, connection is in progress;
   detect, by means of the transmitting side PDCP entity, a condition indicative of the transmitting side PDCP entity experiencing a HFN de-synchronization or a risk of HFN de-synchronization; in response thereto
   maintain the RRC connection and concurrently send, by means of the transmitting side PDCP entity, a control message to the receiving side PDCP entity, the control message comprising information that the RRC connection is lasting and, thus, unbroken as well as information that the transmitting side PDCP entity is experiencing the HFN de-synchronization or the risk of HFN de-synchronization.

9. The UE according to embodiment 8, wherein the memory comprises instructions executable by the processor whereby the transmitting side PDCP entity is operative to:

include, into the control message, a report comprising details related to the experienced HFN de-synchronization or the experienced risk of HFN de-synchronization.

10. The UE according to embodiment 9, wherein the memory comprises instructions executable by the processor whereby the transmitting side PDCP entity is operative to:
include, into the control message, information related to a proposed re-set action to be used by the receiving side PDCP entity.

11. The UE according to any one of the embodiments 8-10, wherein the control message is control PDCP Protocol Data Unit, PDU.

12. The UE according to any one of the embodiments 8-11, wherein the memory comprises instructions executable by the processor whereby transmitting side PDCP entity is operative to:
trigger a RRC counterCheck procedure to verify that HFN synchronization has regained.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. For example, while some of the embodiments described herein have focused on a situation where the transmitting side PDCP entity is part of the UE it should be understood that the transmitting side PDCP could alternatively be comprised, or be integral with, a different apparatus such as e.g. a network node. In other words, the transmitting PDCP entity may be comprised in a UE, or alternatively, in a network node of a RAN. Furthermore, a focus has been to implement the various embodiments of the disclosure at Layer 2, i.e. PDCP. However, as would be appreciated by those skilled in the relevant art, other layers may also be conceivable, such as Layer 3 (e.g. RRC). Still further, while certain 3GPP nomenclature is used throughout this disclosure, it is to be understood that the embodiments are not limited to the 3GPP standardization and, consequently, modifications and other variants e.g. suitable for other standardization(s) are intended to be included within the scope of this disclosure. Although specific terms may be employed herein, they are used in a generic and descriptive sense only and not for purposes of limitation.

The invention claimed is:

1. A method of assisting a receiving side Packet Data Convergence Protocol, PDCP, entity of a network to facilitate its handling of a Hyper Frame Number, HFN, de-synchronization incident, the method being performed by an apparatus, and comprising:
while a Radio Resource Control, RRC, connection is in progress:
monitoring HFN de-synchronization or risk of HFN de-synchronization while the RRC connection is in progress;
detecting, by means of a transmitting side PDCP entity of the apparatus, a condition indicative of the transmitting side PDCP entity experiencing a HFN de-synchronization or experiencing a risk of HFN de-synchronization; and in response thereto
maintaining the RRC connection and concurrently sending a control message to the receiving side PDCP entity, the control message comprising information that the RRC connection is lasting and, thus, unbroken as well as information that the transmitting side PDCP entity is experiencing the HFN de-synchronization or the risk of HFN de-synchronization;
including, into the control message, a report comprising details related to the experienced HFN de-synchronization or the experienced risk of HFN de-synchronization; and
including, into the control message, information related to a proposed re-set action to be used by the receiving side PDCP entity, wherein the proposed re-set action is determined from the details related to the experienced HFN de-synchronization or the experienced risk of HFN de-synchronization.

2. The method according to claim 1, the method comprising:
estimating a number of consecutive ciphered PDCP Packet Data Units, PDUs, that are lost, comparing the estimated number of consecutive ciphered PDCP PDUs that are lost with a predefined threshold value, and determining that there exists a condition indicative of the transmitting side PDCP entity experiencing a HFN de-synchronization or a risk of HFN de-synchronization in response to that the estimated number of consecutive ciphered PDCP PDUs that are lost is higher than the predefined threshold value.

3. The method according to claim 1, wherein the control message is a PDCP control Protocol Data Unit, PDU.

4. The method according to claim 1, further comprising: triggering a RRC counterCheck procedure to verify that HFN synchronization has regained.

5. The method according to claim 1, wherein the apparatus is a User Equipment, UE.

6. A non-transitory computer readable storage medium, comprising instructions which, when executed on at least one processor, cause the at least one processor to carry out the method according to claim 1.

7. An apparatus, for assisting a receiving side Packet Data Convergence Protocol, PDCP, entity of a network to facilitate its handling of a Hyper Frame Number, HFN, de-synchronization incident, the apparatus comprising:
a transmitting side PDCP entity:
a processor; and
a memory comprising instructions executable by the processor whereby the apparatus is operative to:
while a Radio Resource Control, RRC, connection is in progress;
monitor HFN de-synchronization or risk of HFN de-synchronization while the RRC connection is in progress;
detect, by means of the transmitting side PDCP entity, a condition indicative of the transmitting side PDCP entity experiencing a HFN de-synchronization or a risk of HFN de-synchronization; in response thereto
maintain the RRC connection and concurrently send, by means of the transmitting side PDCP entity, a control message to the receiving side PDCP entity, the control message comprising information that the RRC connection is lasting and, thus, unbroken as well as information that the transmitting side PDCP entity is experiencing the HFN de-synchronization or the risk of HFN de-synchronization include, into the control message, a report comprising details related to the experienced HFN de-synchronization or the experienced risk of HFN de-synchronization; and include, into the control message, information related to a proposed re-set action to be used by the receiving side PDCP entity, wherein the proposed re-set action is determined from the details related to the experienced HFN de-synchronization or the experienced risk of HFN de-synchronization.

8. The apparatus according to claim 7, wherein the memory comprises instructions executable by the processor whereby the apparatus is operative to:
estimate a number of consecutive ciphered PDCP Packet Data Units, PDUs, that are lost,
compare the estimated number of consecutive ciphered PDCP PDUs that are lost with a predefined threshold value, and
determine that there exists a condition indicative of the transmitting side PDCP entity experiencing a HFN de-synchronization or a risk of HFN de-synchronization in response to that the estimated number of consecutive ciphered PDCP PDUs that are lost is higher than the predefined threshold value.

9. The apparatus according to claim 7, wherein the control message is control PDCP Protocol Data Unit, PDU.

10. The apparatus according to claim 7, wherein the memory comprises instructions executable by the processor whereby the transmitting side PDCP entity is operative to:
trigger a RRC counterCheck procedure to verify that HFN synchronization has regained.

11. The apparatus according to claim 7, wherein the apparatus is a User Equipment, UE.

* * * * *